(12) United States Patent
    Lucci

(10) Patent No.: US 11,432,645 B2
(45) Date of Patent: Sep. 6, 2022

(54) TABLE SUPPORT ASSEMBLY WITH ELECTRICAL/DATA INTERFACE

(71) Applicant: Ditto Sales, Inc., Jasper, IN (US)

(72) Inventor: Roberto Lucci, Lomazzo (IT)

(73) Assignee: Ditto Sales, Inc., Jasper, IN (US)

( * ) Notice: Subject to any disclaimer, the term of this patent is extended or adjusted under 35 U.S.C. 154(b) by 267 days.

(21) Appl. No.: 16/840,555

(22) Filed: Apr. 6, 2020

(65) Prior Publication Data

US 2021/0307504 A1    Oct. 7, 2021

(51) Int. Cl.
    *A47B 21/06*    (2006.01)
    *A47B 13/02*    (2006.01)
    *H02B 1/04*     (2006.01)

(52) U.S. Cl.
    CPC .............. *A47B 21/06* (2013.01); *A47B 13/02* (2013.01); *H02B 1/04* (2013.01); *A47B 2021/066* (2013.01); *A47B 2200/002* (2013.01)

(58) Field of Classification Search
    CPC .............. A47B 21/06; A47B 2021/066; A47B 2200/002; A47B 13/02; H02B 1/04
    See application file for complete search history.

(56) References Cited

U.S. PATENT DOCUMENTS

| 2,726,712 | A | * | 12/1955 | Weller | A47B 83/02 |
| | | | | | 297/337 |
| 4,494,627 | A | * | 1/1985 | Arent | B25H 1/06 |
| | | | | | 182/129 |
| 2016/0345729 | A1 | * | 12/2016 | Udagawa | A47C 7/62 |
| 2021/0106133 | A1 | * | 4/2021 | Anderson | A47B 21/06 |
| 2021/0204690 | A1 | * | 7/2021 | Lim | A47B 13/02 |
| 2021/0212452 | A1 | * | 7/2021 | Colin | A47B 21/06 |
| 2021/0396258 | A1 | * | 12/2021 | Udagawa | A47B 21/06 |

* cited by examiner

*Primary Examiner* — Matthew W Ing
(74) *Attorney, Agent, or Firm* — Maginot, Moore & Beck, LLP

(57) ABSTRACT

A table includes a table top with at least three corners. A support assembly includes a plurality of hollow tubes configured to carry electrical/data wires and having end openings. Each tube is connected to the underside of the table top such one end of the tube is arranged at a corresponding corner of the table top so that an end opening is accessible at the corresponding corner. The support assembly further includes a plurality of leg assemblies, each leg assembly including a pair of leg members joined at a curved portion, the curved portion sized and configured a tube with the end opening accessible at the curved portion. An outlet plate is mounted to the leg assembly to cover the end opening and is provided with one or more electrical sockets and data ports connectable to electrical/data wires carried in the hollow tube.

13 Claims, 10 Drawing Sheets

TABLE SUPPORT ASSEMBLY WITH ELECTRICAL/DATA INTERFACE

BACKGROUND

The present disclosure relates to power and data features for furniture, such as conference tables and work stations. In particular, furniture with an electrical and/or data interface integrated into the support structure for the furniture In this increasingly data-driven age people rely on their laptop, cell phone, and tablet at a conference or in their workplace. These electronic and computer devices require access to power and data lines. Whereas in the past a work surface was littered with power strips, electrical cords, and data cables, access modules have been provided that are mounted in the work surface so that these components can be hidden beneath the work surface, thereby ridding the work surface of a significant nuisance. A typical power/data access module includes a bezel that is mounted within a correspondingly shaped opening in the work surface or table top. The module provides access to a receptacle within and/or underneath the table top, with the receptacle carrying one or more electrical sockets and/or data ports These types of access modules embedded within the table help retain the work surface when the modules are not in use. However, when it is desired to plug a cell phone into a data/power port the presence of the access module in the surface of the table top interrupts the work surface. There is a need for an electrical/data interface that allows users to access power and data sockets and ports without disrupting the work surface of the table top.

SUMMARY OF THE DISCLOSURE

An article of furniture such as a table is provided with an integrated electrical/data interface that is readily accessible to persons working at the table. In one aspect, the article of furniture is a table with a table top having a working surface and an underside. The table top include at least three corners. The table includes a support assembly connected to the underside of the table top and supporting the table top above a ground surface. In one aspect, the support assembly includes a plurality of hollow tubes, each tube configured to carry electrical/data wires and having end openings at opposite ends thereof. Each tube is connected to the underside of the table top such that one of the opposite ends is arranged at a corresponding corner of the table top so that the end opening is accessible at the corresponding corner. The support assembly further includes a plurality of leg assemblies, each leg assembly including a pair of leg members joined at a curved portion that is sized and configured to receive one of the opposite ends of a tube with the end opening of the tube accessible at the curved portion. In a further feature, an outlet plate is removably mounted to either the leg assembly or the tube to cover the end openings. The outlet plate includes one or more electrical sockets and data ports connectable to electrical/data wires carried in the hollow tube.

DETAILED DESCRIPTION

Figure 1:
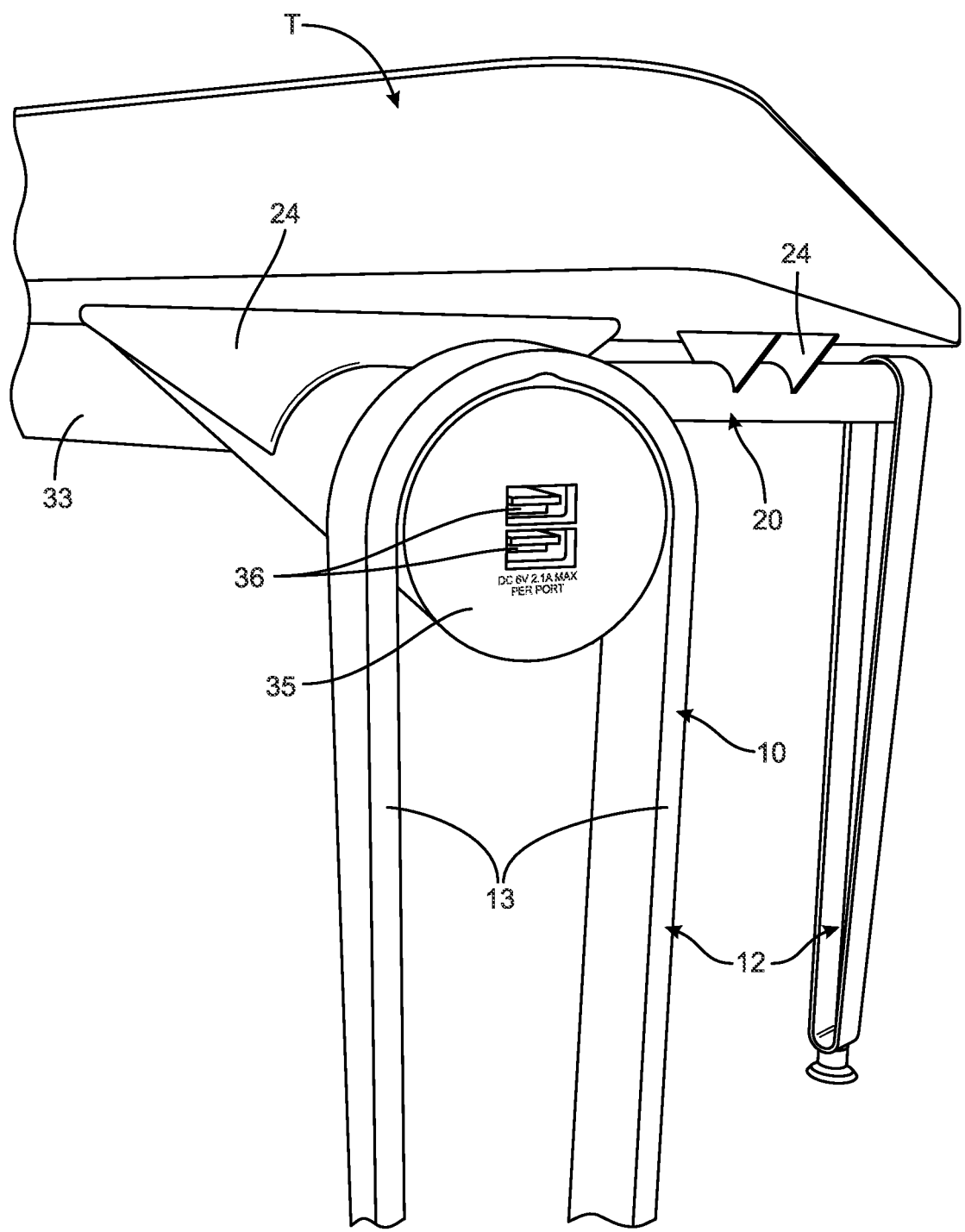
FIG. 1 is a side perspective view of a corner of a table incorporating the electrical/data interface of the present disclosure.
Figure 2:
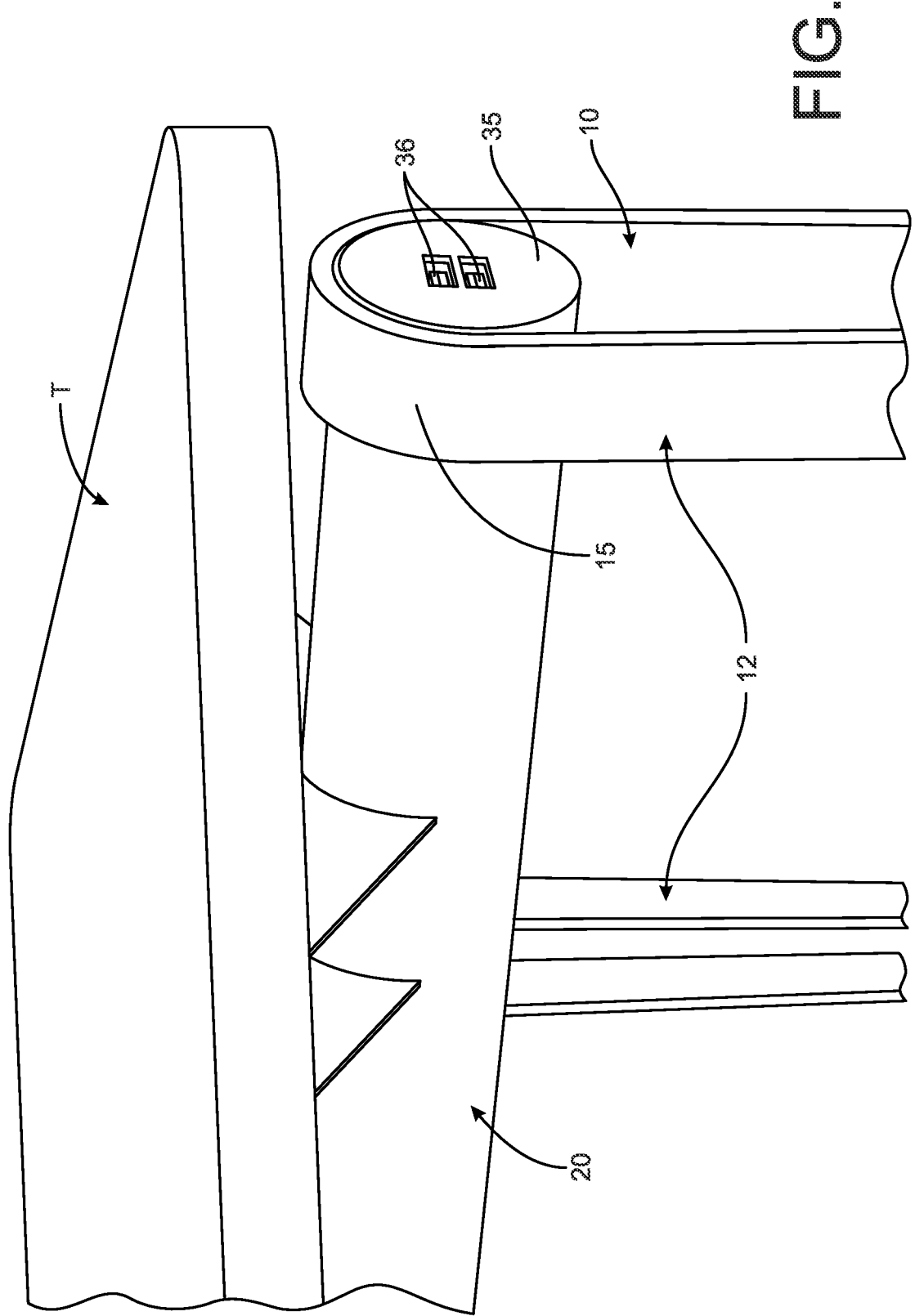
FIG. 2 is a further side perspective view of the corner of a table shown in FIG. 1.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

An article of furniture, such as the table shown in FIGS. 1-7, includes a working surface in the form of a table top T that is supported by a support assembly 10 on a ground surface, such as a floor. The support assembly 10 includes three or more leg assemblies 12, preferably corresponding to the number of corners of the table top. For instance, a typical work table is rectangular with four corners, so the support assembly for that table can have four leg assemblies 12, one at each corner. Similarly, a triangular or pentagon-shaped table top will have 3 or 5 corners and thus 3 or 5 leg assemblies. A circular table top can include three or more leg assemblies as desired, with the leg assemblies positioned at the perimeter of the table top. The table top T is directly mounted to a horizontal support assembly 20 to span the horizontal dimensions of the table top and provide adequate vertical support for the table top. The leg assemblies 12 are connected to the horizontal support assembly 20 to complete the support assembly 10.

Each leg assembly 12 includes two vertical leg members 13 that define a curved portion 15 at an upper end of the leg assembly. In one embodiment, the leg members and curved portion are formed from a common bar that forms the opposite vertical leg members and the curved portion. The common bar can be extruded in this configuration or can be formed from a flat bar that is bent around a mandrel to form the curved portion 15. In another embodiment, the leg assemblies 12 can be formed by two leg sections attached, such as by welding, to form the opposite vertical leg members 13 and curved portion 15. The leg assemblies 12 can be formed by other means to create the configuration shown in FIG. 4. In one embodiment the curved portion 15 is generally circular with the vertical leg members 13 extending tangentially from the circular form at approximately diametrically opposite points, as best seen in FIG. 1.

Figure 4:
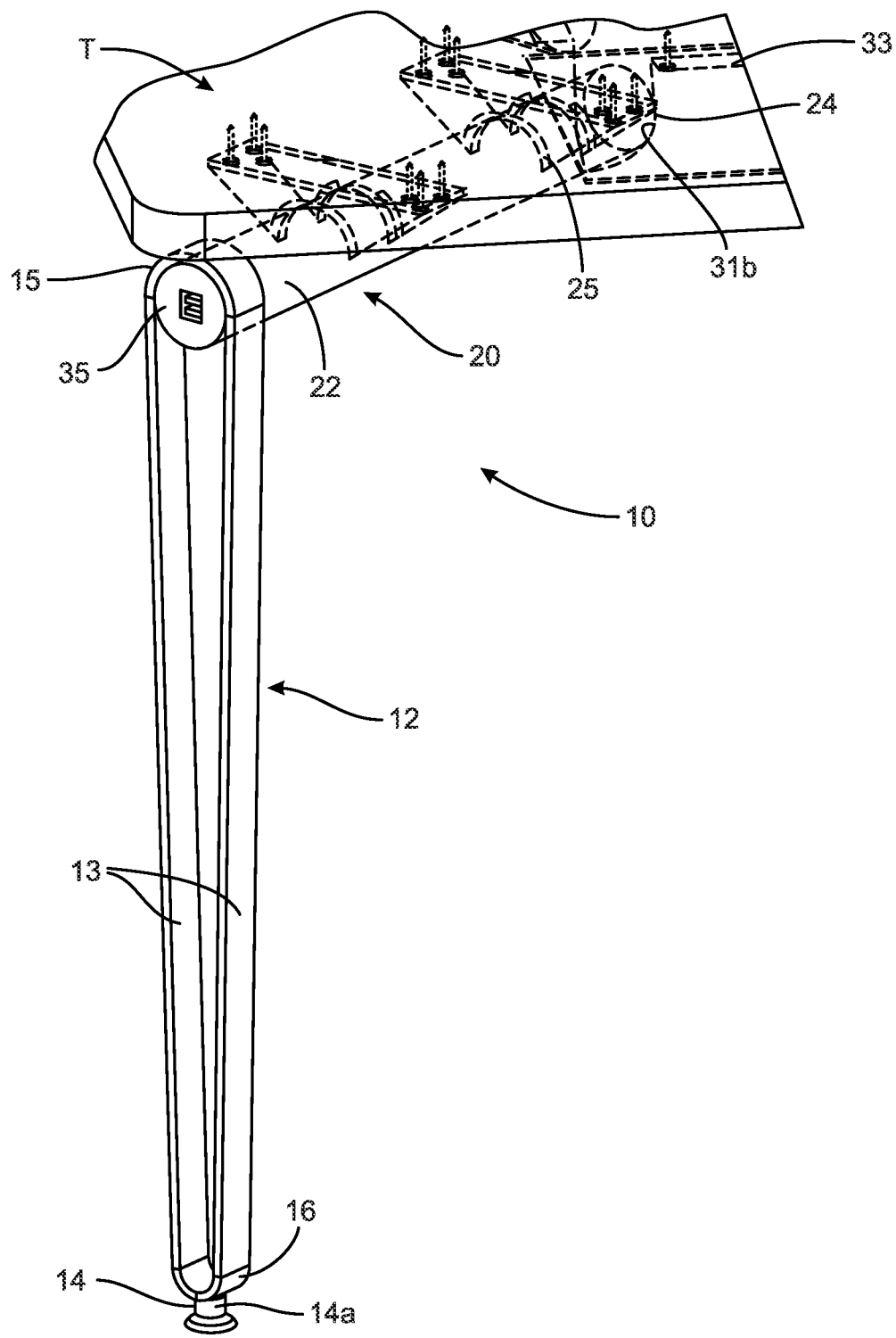
FIG. 4 is a partial cut-away view of the corner of a table shown in FIG. 1.

Each leg assembly further includes a foot member 14 disposed at the opposite end of the leg members from the curved portion 15. The foot member 14 can be attached to the bottom of the vertical leg members 13 and can include a height adjustable foot pad 14a as is known in the art. The foot member 14 can be affixed to a lower curved portion 16 of the leg assembly, as shown in FIG. 4. The lower curved portion 16 can be integral with the leg members 13 so that the two leg members 13 and the two curved portions 15, 16 form a closed semi-oval shape. In the illustrated embodiment, the upper curved portion 15 is curved at a larger circular diameter than the lower curved portion 16, so that the leg assembly 12 gives the appearance of a tapered leg. Of course, other leg configurations are contemplated for other aesthetic appearances.

The electrical/data interface feature of the present disclosure is provided by the horizontal support assembly 20. In particular, the assembly 20 includes a horizontally disposed tube 22 that is seated within the upper curved portion 15 of each leg assembly. Each tube 22 defines a hollow channel 23 (FIG. 7) along its length, with the end of the channel forming an opening 31 at the end of the tube 22 disposed within the curved portion of the leg assembly 12. The table top T is mounted to the tubes 22 by mounting brackets 24 that are affixed to the underside of the table top. The mounting brackets can define a curved seat 25 to receive the tube, with both features being generally circular. The mounting brackets 24 can be configured to clamp the tubes 22 of the support assembly or can be affixed to the tubes in a conventional manner, such as by screws or similar fasteners. The tubes 22 in the horizontal support assembly 20 are arranged so that the end opening 31a of each tube is disposed within a leg assembly 12, which, as described above, is situated at the corners of the table top T. For the rectangular table top T of the illustrated embodiment, four tubes 22 are provided corresponding to the four leg assemblies 12 and the four corners of the table top.

Figure 10:
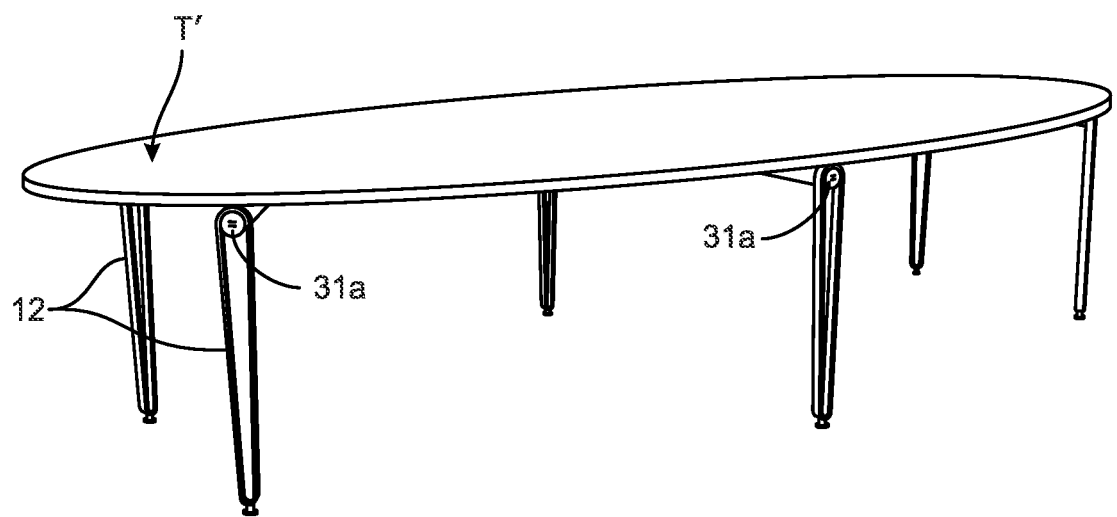
FIG. 10 is a perspective view of an oval table top incorporating the electrical/data interface of the present disclosure.

According to the present disclosure, the support assembly 10 is configured so that the tube openings 31a are situated at perimeter of the working surface, such as the table top T. In one specific embodiment, the openings 31a are aligned with the corners of the rectangular table top so that the openings are accessible at a location of the table that does not interfere with a person sitting at the table. For table tops having non-rectangular shapes, such as the oval table shown in FIG. 10, the leg assemblies 12 can be distributed along the perimeter of the table top T', so that the leg assemblies do not interfere with persons sitting at the table, and so that the openings 31a are readily accessible to those persons. Moreover, according to one aspect of the present disclosure, the openings 31a provide an ideal location for accessing electrical power and data. An outlet plate 35 is affixed at the end of the tube 22, with the outlet plate 35 including one or more ports, such as ports 35. The ports can be conventional data ports or can include a conventional electrical socket. The outlet plate 35 can provide an array of ports within the circular diameter of the plate. The plate 35 can include fitting or hub 32 (FIG. 6) that can be configured to be removably engaged within the opening 31 of the tube, such as by a threaded or press-fit engagement.

Figure 3:
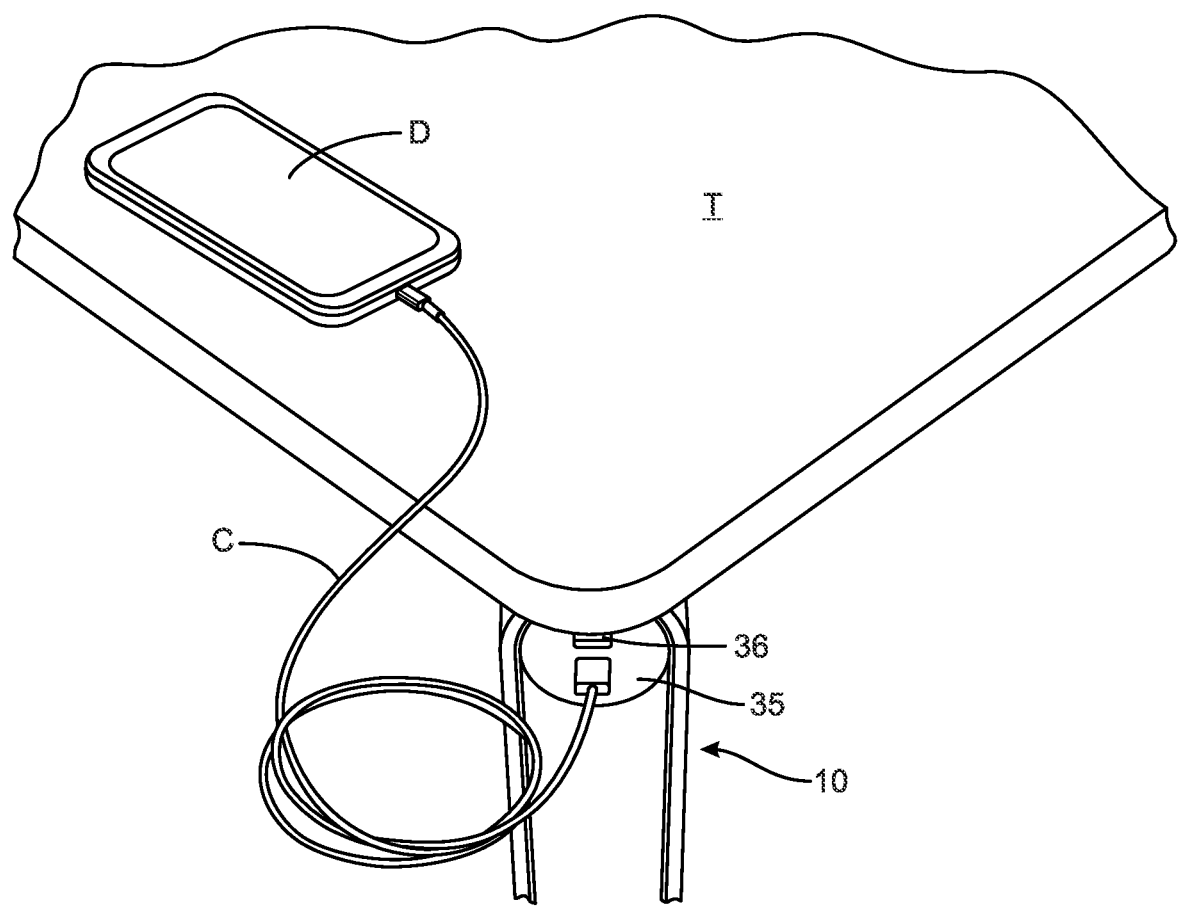
FIG. 3 is a top perspective view of the corner of a table shown in FIG. 1.

As shown in FIG. 3, the outlet plate 35 in the horizontal support assembly 20 provides easy access for receiving a data cable C of a device D, such as a smart phone. The cable C can be kept clear of the center of table top T and the user's device D can be placed near the corner of table top so that it, too, is clear of the work space.

Figure 5:
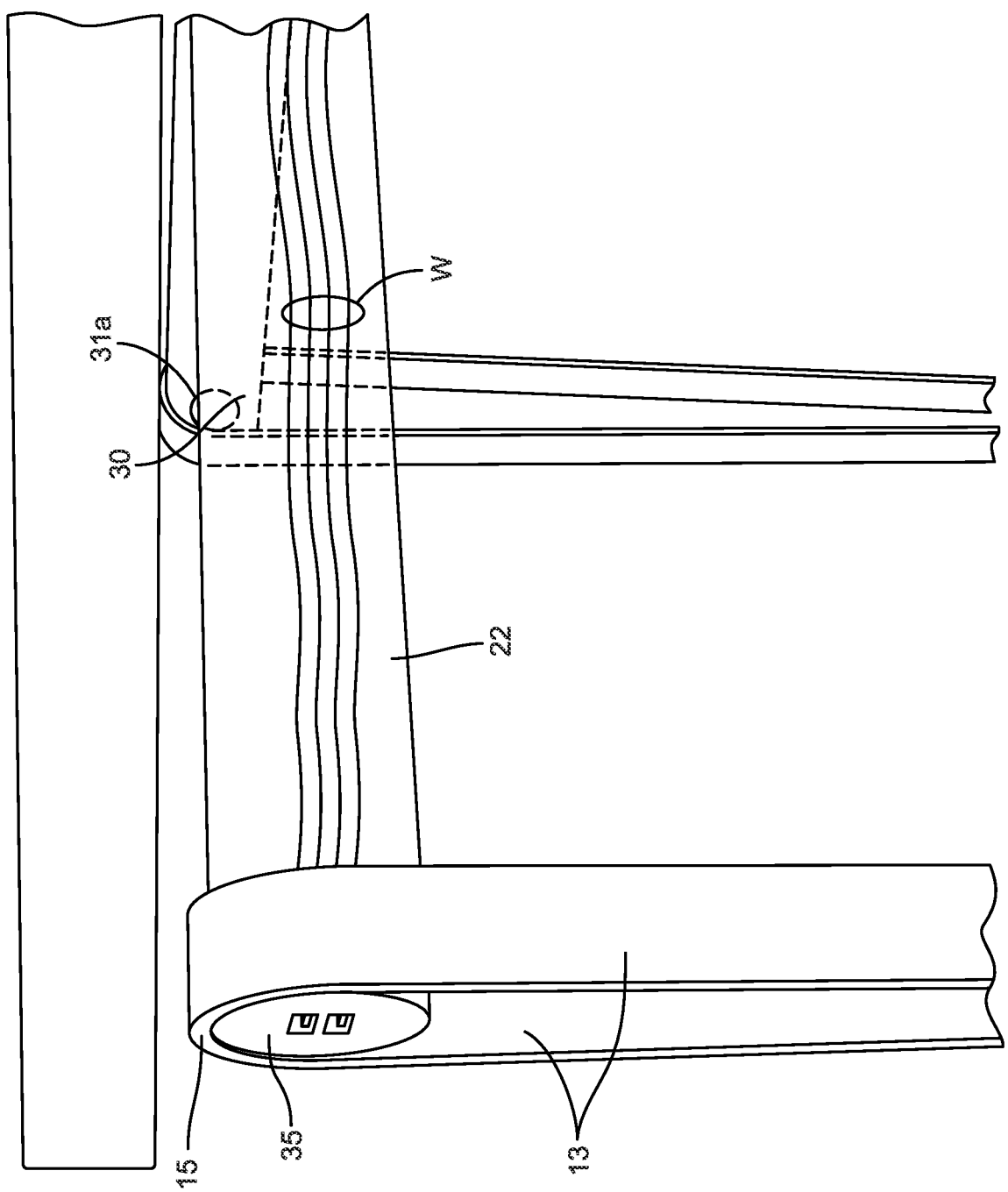
FIG. 5 is a partial phantom side view of the corner of a table shown in FIG. 1.
Figure 6:
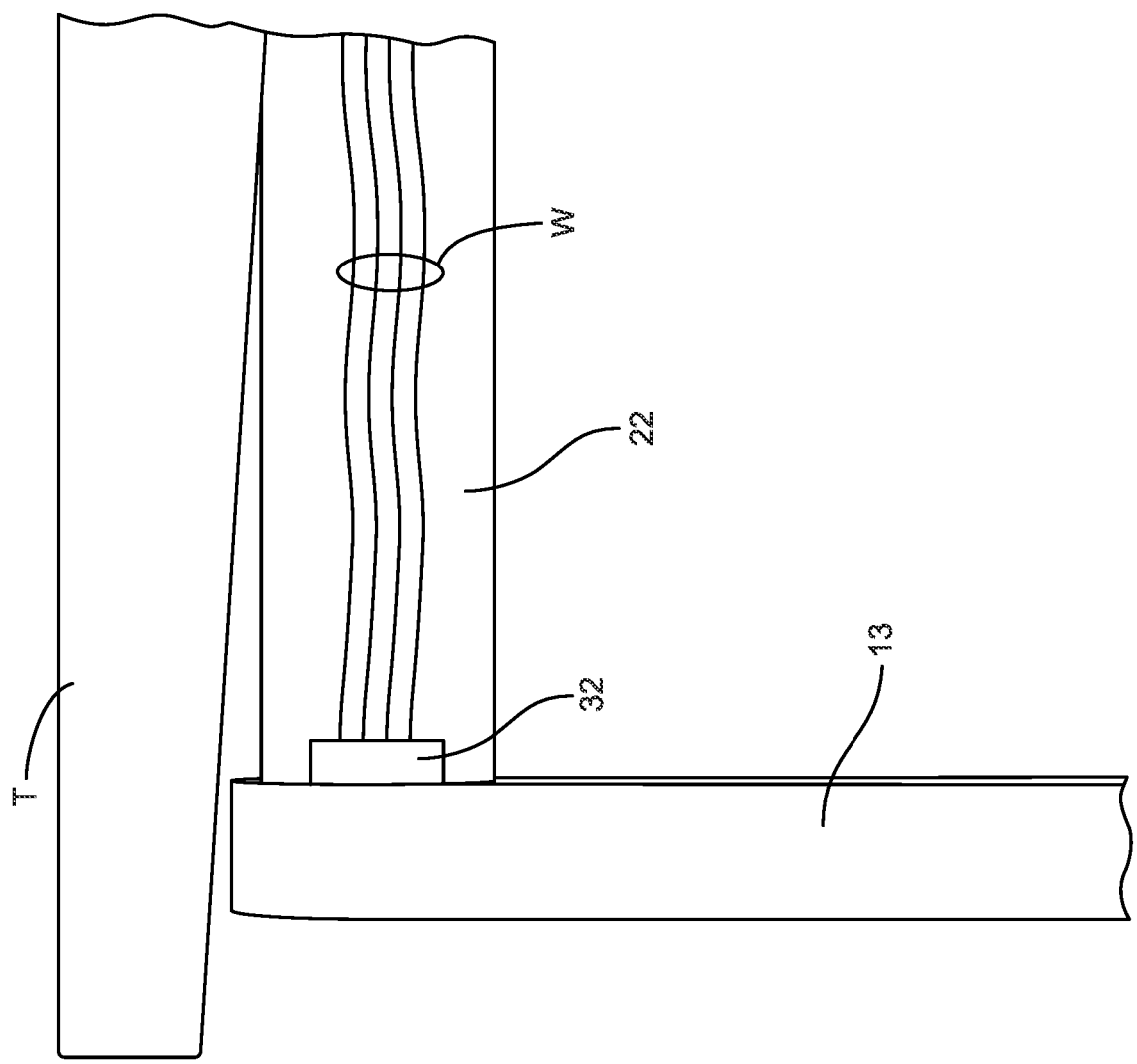
FIG. 6 is a partial phantom side view the corner of a table shown in FIG. 1.
Figure 7:
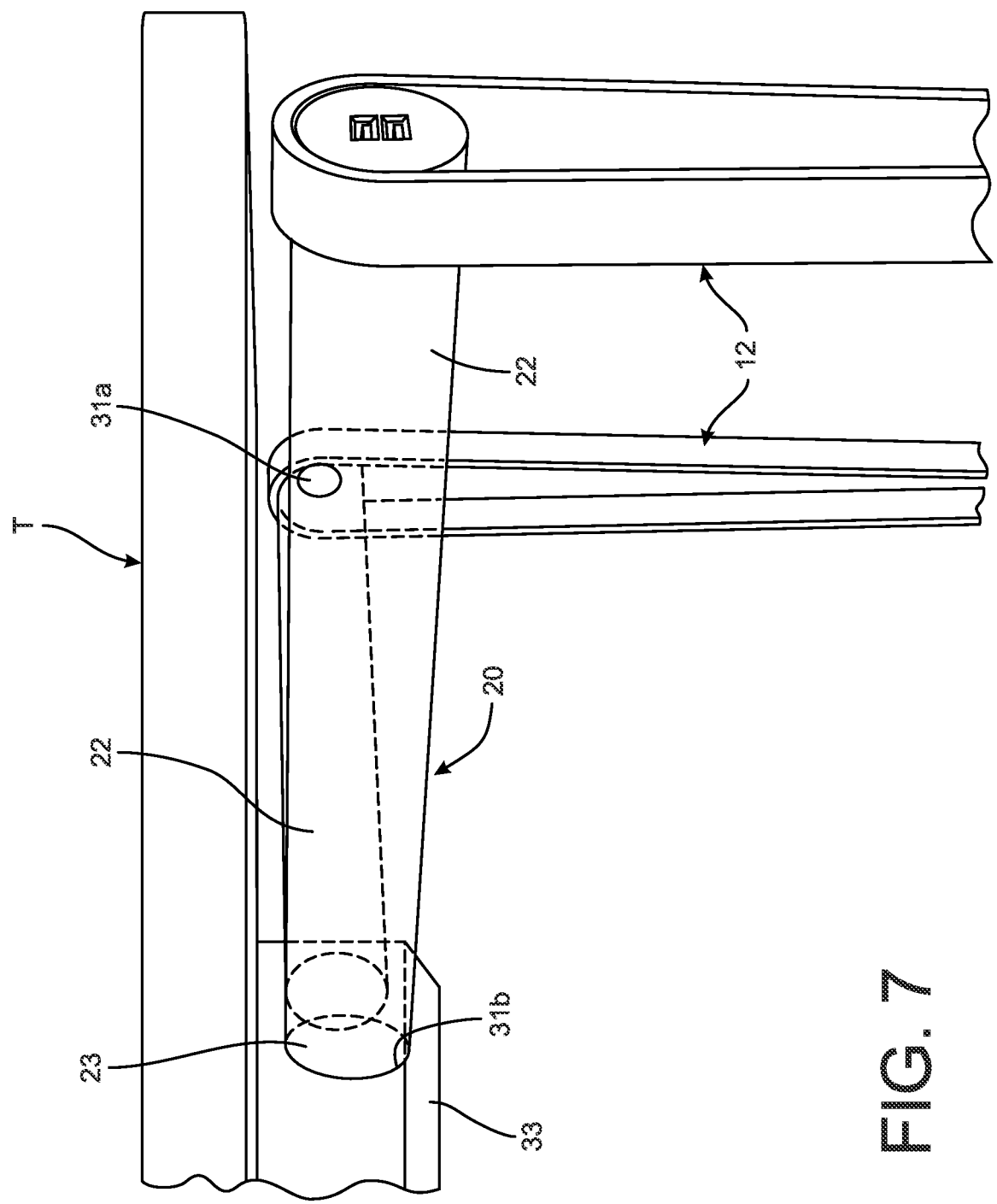
FIG. 7 is another partial phantom side view the corner of a table shown in FIG. 1.

In the illustrated embodiment, the horizontal support assembly 20 is configured so that the tubes 22 converge to the center of the table. The interior openings 31b of the tubes are disposed within a central tray 33 (FIGS. 4, 7) that is affixed to the underside of the table top T. The tray may contain a wireless communications component, a wiring/data hub, a power supply or a similar electrical/data component, to which wires W passing through each of the tubes 22 is connected (FIGS. 5-6). It is also contemplated that the electrical/data component can be mounted directly to the underside of the table top without the tray, preferably centrally but optionally at other locations on the table top. The tray may also serve as a branch point for electrical/data connection to an external source, such as an electrical socket or data port. Alternatively, the exterior opening 31a of one of the tubes 22 can provide an egress point for wiring associated with the other tubes of the support assembly, serving as the branch point for connection to the external source. It can be appreciated that all of the electrical/data wiring associated with all of the outlet plates 35 of the support assembly 10 is contained within the tubes 22 and the central tray 33, so that none of the electrical/data interface components of the table or furniture item are exposed or susceptible to becoming entangled with a person sitting at the table. It can also be appreciated that the removable outlet plates 35 allow the electrical/data interface for the table to be tailored to a wide range of needs.

Figure 8:
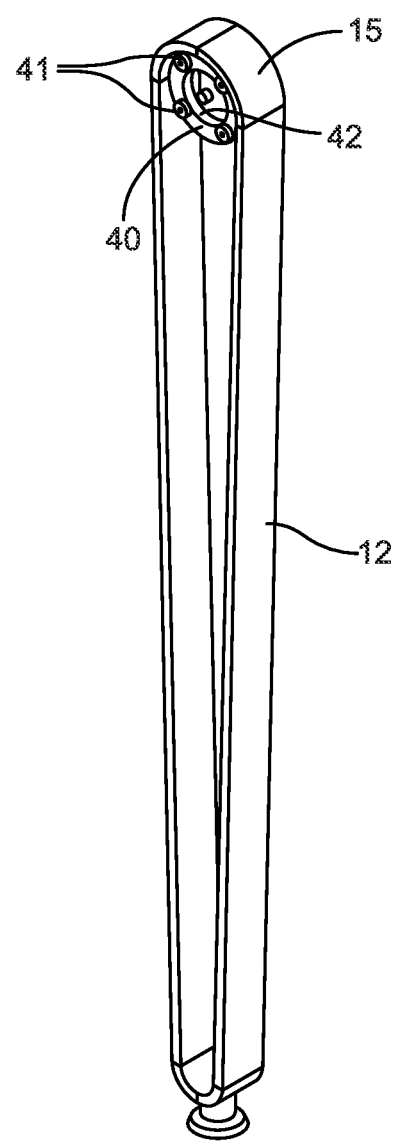
FIG. 8 is a perspective view of a leg assembly of the table shown in FIG. 1.
Figure 9:
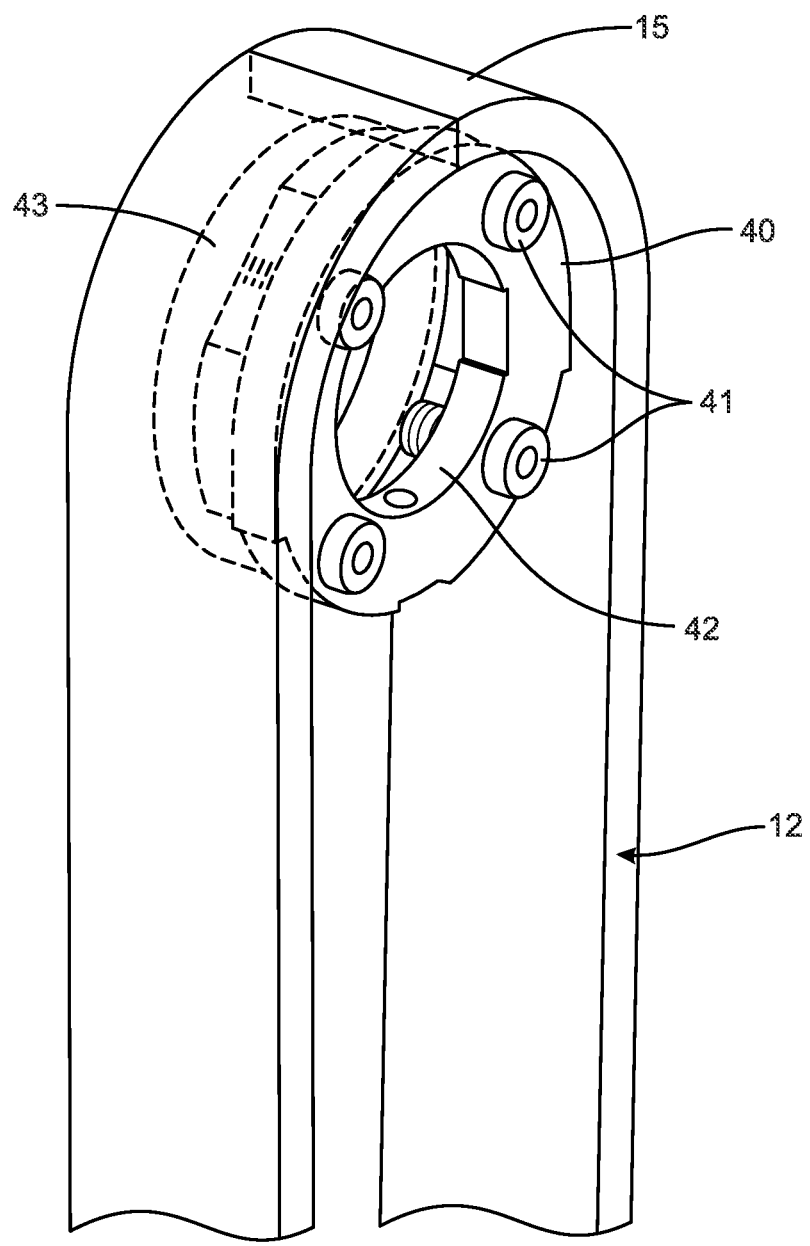
FIG. 9 is a perspective view of a mounting hub for mounting a tube to a leg assembly.

The leg assembly 12 can be configured as shown in FIGS. 8-9 for engagement to the end of the tubes 22. In this embodiment, the leg assembly includes a collar 40 engaged inside the curved portion 15, such as by welding or other means of fastening. The collar 40 includes a bolt circle 41 with threaded fasteners extending from the collar. The bolt circle coincides with a circle of threaded openings in the end of the tube 22 at the opening 31a. The threaded fasteners of the bolt circle 41 are thus used to engage the end of the tube 22 to the collar 40, which in turn connects the leg assembly 12 to the horizontal support assembly 20. Alternatively, the end of the tube 22 can include fasteners, such as bolts, projecting from the end, and the bolt circle 41 of the collar 40 includes openings to receive the bolts. A nut can be threaded onto each bolt to fix the tube 22 to the collar 40. The collar 40 defines a central opening 42 through which wiring from the outlet plate 35 extends to enter the tube 22. The central opening 42 can also be configured for removable engagement of the outlet plate 35, and particularly for removable engagement of the hub 32 projecting from the plate. As mentioned above, the hub 32 can be configured for a threaded or press-fit engagement within the central opening 42. It can be appreciated that the outlet plate 35 will cover the bolt circle 41 when it is engaged to the support assembly. Alternatively, the collar 40 can include a sleeve 43 that can be configured for a tight-fitting or other suitable engagement with the end of a tube 22, to hold the tube in position in conjunction with the mounting brackets 24. Other means for engaging the tubes to corresponding leg assemblies are contemplated provided that the end openings 31a of the tubes are accessible to an outlet plate 35.

It is contemplated that for any given article of furniture, such as a table, the end openings of the support assembly tubes can be covered with an outlet plate 35 or a dummy plate that does not include any electric/data ports 41. Alternatively, the outlet plates at each corner can be configured with different types of electric/data ports. The removable outlet plates 35 allow the electric/data access to be tailored for the article of furniture.

The components of the support assembly can be formed from materials commonly used for articles of furniture, such as office and conference tables. For instance, the leg assembly can be formed of anodized steel, while the horizontal support assembly can be formed of stainless steel, aluminum or a rigid plastic material.

The present disclosure should be considered as illustrative and not restrictive in character. It is understood that only certain embodiments have been presented and that all changes, modifications and further applications that come within the spirit of the disclosure are desired to be protected. For instance, it should be appreciated that the support assembly 10 can be used to support the seat and back of a chair so that the chair can be provided with electrical/data accessibility. In that instance, the working surface is not the table top T but instead the seat of the chair. It can also be appreciated that the support assembly 20 in the illustrated embodiment is configured to support a generally horizontally disposed surface, such as a table top or seat. However, the entire support assembly can be configured to support the working surface of the article of furniture at non-horizontal orientations, as desired for the particular article of furniture.

It is also contemplated that the leg assembly can be a T-configured assembly in which the foot member extends horizontally or perpendicular to the end of the leg members 13, or in which the foot member is a cross-configuration. In this instance, the article of furniture may only require two leg assemblies since the foot member is configured to stabilize the support assembly in a known manner. In this instance, the support assembly 10 is configured so that the outlet plates 35 can be adjacent the perimeter of the working surface or table top, rather than at a corner of the working surface.

In certain configurations, a single tube 22 can be provided that extends from one side or end of the working surface or table top, to the opposite side or end. The leg assemblies engaged at the opposite ends of the single tube can be configured as described above—i.e., having a T-configuration or across-configuration that is capable of supporting the working surface with only two vertical leg assemblies.

What is claimed is:

1. A support assembly for an article of furniture, the article of furniture having a working surface, the assembly comprising:
   a horizontal support assembly connected to and supporting said working surface above a ground surface, the horizontal support assembly including a number of hollow tubes configured to carry electrical/data wires and having end openings at opposite ends thereof;
   a plurality of leg assemblies, each leg assembly of the plurality of leg assemblies including a pair of leg members joined at a curved portion, the curved portion sized and configured to receive an end of one tube of the number of hollow tubes with one of the end openings of said one tube accessible at said curved portion; and
   at least one outlet plate mounted to at least one of said leg assembly and said one tube to cover said one of the end openings, said outlet plate including one or more electrical sockets and data ports connectable to electrical/data wires carried in said one or more hollow tubes.

2. The support assembly of claim 1, wherein:
   said leg assembly includes a collar disposed within said curved portion; and
   said support assembly includes a plurality of fasteners engaged between said collar and said end of said one tube to fasten said one tube to said leg assembly.

3. The support assembly of claim 1, wherein said outlet plate is removably mounted to at least one of said leg assembly and said one tube.

4. The support assembly of claim 3, wherein said outlet plate is removably mounted by a threaded or a press-fit interface with at least one of said leg assembly and said one tube.

5. The support assembly of claim 1, wherein each leg assembly of the plurality of leg assemblies includes a foot member connected to said pair of leg members.

6. A table, comprising:
   a table top having a working surface and an underside, the table top including at least three corners;
   a support assembly connected to the underside of said table top and supporting said table top above a ground surface, the support assembly including;
   a plurality of hollow tubes, each tube of said plurality of hollow tubes configured to carry electrical/data wires and having end openings at opposite ends thereof, each tube connected to the underside of said table top such that one of said opposite ends is arranged at a corresponding corner of said at least three corners so that said end opening at said one of said opposite ends is accessible at said corresponding corner;
   a plurality of leg assemblies, each leg assembly of the plurality of leg assemblies including a pair of leg members joined at a curved portion, the curved portion sized and configured to receive one of said opposite ends of the tube with said one of the end openings of the tube accessible at said curved portion; and
   at least one outlet plate mounted to at least one of said leg assembly and said tube to cover said one of the end openings, said outlet plate including one or more electrical sockets and data ports connectable to electrical/data wires carried in said one or more hollow tubes.

7. The table of claim 6, wherein:
   said leg assembly includes a collar disposed within said curved portion; and
   said support assembly includes a plurality of fasteners engaged between said collar and said end of said one tube to fasten said one tube to said leg assembly.

8. The table of claim 6, wherein said outlet plate is removably mounted to at least one of said leg assembly and said one tube.

9. The table of claim 8, wherein said outlet plate is removably mounted by a threaded or a press-fit interface with at least one of said leg assembly and said one tube.

10. The table of claim 6, wherein each leg assembly of the plurality of leg assemblies includes a foot member connected to said pair of leg members.

11. The table of claim 6, wherein:
   said table top has a central portion inside said at least three corners;
   said plurality of leg assemblies includes a leg assembly corresponding to each of said at least three corners of the table top; and
   said plurality of hollow tubes includes a tube corresponding to each of said at least three corners of the table top, wherein said tube is connected to the underside of said table top so that the other of said opposite ends is arranged at said central portion of said table top.

12. The table of claim 11, further comprising a tray fastened to the underside of said table and covering said other of said opposite ends of each tube of said plurality of tubes.

13. The table of claim 6, further comprising:
   at least one mounting bracket corresponding to each of said plurality of hollow tubes and configured to fasten each tube to the underside of said table top.

* * * * *